Patented Nov. 15, 1927.

1,649,110

UNITED STATES PATENT OFFICE.

PHILIP D. GREENSTEIN, OF BRIDGEPORT, CONNECTICUT, ASSIGNOR TO THE RAYBESTOS COMPANY, OF BRIDGEPORT, CONNECTICUT, A CORPORATION OF CONNECTICUT.

FRICTION ELEMENT AND METHOD OF MAKING SAME.

No Drawing.    Application filed July 30, 1924.   Serial No. 729,068.

This invention relates to improvements in the manufacture of friction elements and refers more particularly to friction facings used in the power transmission clutches of automobiles and other machines, wherein the base of the friction facing consists essentially of asbestos fibre.

As is well known, there are two general types of clutch facings having a fibrous asbestos as the body of the facing. In one type, asbestos yarn made by spinning selected long fibre asbestos around copper or brass wire is woven into a tape of suitable width and thickness, the latter impregnated with the treating solution and wound on a mandrel so as to form a closely packed helix, which, after baking at a suitable temperature, can be cut into annular clutch facings of the required size. In the other type, short fibre asbestos is charged to a beater engine such as is used in paper making, and suspended in a large quantity of water, whereby the asbestos fibres are separated from each other and can then be sheeted on a wet machine such as is used in making book binder's board. The sheets of asbestos thus prepared, are pressed, dried and calendered to the proper thickness, after which rings are cut therefrom with a die. The rings are then impregnated with the treating solution and dried or baked to the required stiffness.

The treating solutions referred to above, which are most used at the present time, consist of various oils, bitumens, resins, phenolic condensation products, or the like, dissolved in some volatile solvent such as gasoline. From the standpoint of economy, reduction of fire-hazard and hygienic considerations it is an important desideratum to eliminate the inflammable solvents referred to above and to substitute water therefor.

I am aware of the fact that the use of a water soluble saturant for friction facings is not novel and is in common use by those skilled in the art. The serious objection to the water soluble saturants ordinarily used (such as molasses, glue, casein, dextrin, water soluble phenol resins, and the like) is the fact that when thoroughly dried the residues are brittle solids which easily crumble to a powder upon heat and abrasion such as that to which they are subjected in a friction facing. This brittle solid has thus little or no binding effect, or even displays an abrasive effect, and as a result the facing is subjected to very rapid wear. Also, because of the dusting accompanying this abrasion the coefficient of friction does not remain steady but varies considerably.

I have found that if there be added to any of the water soluble saturants referred to above, a small proportion of water soluble oily substance, such as, for example, a sulphonated vegetable or animal oil, the faults aforementioned are in large part removed. That is, the saturant remaining in the friction element after drying is no longer brittle and non-coherent but is now tough, and acts as an excellent binder to prevent the asbestos fibres from fraying out. In this way, the life of the friction element is considerably lengthened. Also, during the normal rise in temperature accompanying the use of the friction element the saturant softens and flows somewhat and then hardens, thus producing a durable surface whose frictional coefficient is uniform and sufficiently high for efficient transmission of power.

As an example of one saturant that may be used, the following is given:

| | Parts by weight. |
|---|---|
| Molasses | 85 |
| Sulphonated castor oil | 15 |
| Water | 50 |

One method of preparing woven clutch facings may be as follows:

The asbestos woven tape may be calendered to a thickness about .010″ below the required thickness of the finished clutch facing to allow for swelling during the saturation and may be then immersed in the cold saturant specified above for a period long enough to allow complete penetration of the latter, 30 minutes being usually sufficient. The time required here will vary with the density of the tape. The saturated tape may be removed from the saturant, the excess on the surface being removed by scraping with a suitable knife. At this point, the tape will have absorbed 50-60% of its weight of saturant. It may now be allowed to air dry for 2 to 3 hours, at the end of which it will be firm enough for winding into a flat helix and flexible enough to conform to the mandrel without cracking. After winding on the mandrel in the form of a closely packed helix and fixing in this condition by suitable mechanical means, the mandrel containing the wound tape may be placed in an oven heated to 400-450° F. It is kept at this temperature for a period of 3 to 6 hours or until the water has been completely removed and the tape has become sufficiently stiff and hard. The helix may now be removed from the mandrel and cut into rings, whose size is preferably predetermined by the diameter of the mandrel and the width of the tape. The ends of the cut rings are tightly fastened together with copper wire clips. The rings are now pressed in a die to exact dimensions. The finished woven clutch facing will contain 15-20% hardened saturant.

One method of preparing unwoven clutch facings may be as follows:

Sheet asbestos prepared as hereinbefore described may be cut into annular rings. These are laid on a conitnuous belt of coarse wire screen and are carried through a suitable saturant, in which a stronger binder, such as a thin casein solution, is preferably substituted for molasses as indicated above, at such a rate that the period of immersion is 15-30 minutes, which is sufficient for a complete saturation. The saturated rings are spread on coarse wire screen trays and placed in an oven whose temperature is gradually raised to 325° F. during a short preliminary period which may be 1 to 2 hours. The baking may be continued at 325-350° F. for 4 or 5 hours more, or for a sufficient length of time to reach the desired hardness, when the rings are removed from the oven. After cooling, they may be sanded in a wood finishing machine to the correct thickness, and may be ground to the correct inside and outside diameter in a lathe.

Alternatively, the baking of the rings may be carried out thus: The saturated rings may be dusted with graphite and stacked in packs of 200-300 rings held tightly together by iron plates at each end of the pack secured by bolts. The packs are placed in an oven and the temperature raised gradually to 400° F. during a short preliminary period, which may be 1-2 hours. The baking may be continued at 400-425° F. for a period sufficient to attain a satisfactory cure which may be 3 to 5 hours, when the rings are removed, cooled and finished as in the preceding paragraph.

The finished unwoven clutch facings made by either of the above methods will now contain about 20% hardened saturant.

Woven or unwoven clutch facings containing the saturant produced by following the procedures specified will show a desired coefficient of friction when tested in an automobile clutch, for instance, of 0.30, and will not vary materially from this figure.

This general type of impregnating materials for use as binders in friction materials may also be applied to the manufacture of asbestos brake linings with advantageous results. This of course, merely involves a change in the form of the blank asbestos material to be saturated.

It is to be understood that I do not limit myself to the aforementioned proportions, nor to the particular substances mentioned in the saturant, molasses being one of a large class of water soluble organic substances such as dextrin, casein, glue, water soluble phenol resins, and the like, and sulphonated castor oil being the prototype of a large number of sulphonated oils, such as corn, fish, cottonseed, and other oils. The selection of the particular oil and the proportions to be used will depend upon the type of friction element desired and is a matter that can be readily decided upon by those skilled in the art. The methods of fabricating the finished clutch facing may be varied considerably without departing from the sense of the invention.

I claim as my invention:

1. A friction element comprising a fibrous asbestos base, and a binder comprising essentially the residue from the heat treatment of a mixture of a water soluble organic substance and a water soluble oil.

2. A friction element comprising a fibrous woven asbestos base, and a binder comprising essentially the residue from the heat treatment of a mixture of a water soluble organic substance and a sulphonated oil.

3. A method of making friction elements comprising saturating a fibrous asbestos base in an aqueous mixture comprising essentially a water soluble organic substance and a water soluble oil, and heat treating the saturated base to eliminate the water and harden the residue.

4. A method of making friction elements comprising saturating a fibrous woven asbestos base in an aqueous mixture containing essentially a water soluble organic substance and a sulphonated oil, and heat treating the saturated base to eliminate the water and harden the residue.

PHILIP D. GREENSTEIN.